United States Patent [19]

Lofquist

[11] 4,097,546

[45] Jun. 27, 1978

[54] OZONE RESISTANT, CATIONIC DYEABLE NYLON CONTAINING LITHIUM, MAGNESIUM OR CALCIUM SALTS OF SULFONATED POLYSTYRENE COPOLYMERS

[75] Inventor: Robert Alden Lofquist, Richmond, Va.

[73] Assignee: Allied Chemical Corporation, Morris Township, N.J.

[21] Appl. No.: 671,789

[22] Filed: Mar. 30, 1976

[51] Int. Cl.$^2$ .............................................. C08L 77/00
[52] U.S. Cl. ..................... 260/857 UN; 260/78 SC; 260/857 L
[58] Field of Search ............................. 260/857 UN

[56] References Cited

U.S. PATENT DOCUMENTS

| | | | |
|---|---|---|---|
| 2,676,896 | 4/1954 | Cohen | 260/857 X |
| 3,190,763 | 6/1965 | Schleede | 260/DIG. 17 |
| 3,213,053 | 10/1965 | Kendrick | 260/DIG. 17 |
| 3,472,819 | 10/1969 | Stephens | 260/857 |
| 3,514,498 | 5/1970 | Okazaki | 260/857 |
| 3,553,286 | 1/1971 | Murata | 260/857 UN |
| 3,665,054 | 5/1972 | Burrows | 260/857 UN |

*Primary Examiner*—Paul Lieberman
*Attorney, Agent, or Firm*—Richard A. Anderson

[57] ABSTRACT

This invention discloses the improved method of making nylon cationic dyeable whereby the soluble lithium, magnesium or calcium salt of a sulfonated polystyrene copolymer is added, to provide improved lightfastness and ozone resistance over conventional cationic dyeable nylon.

8 Claims, No Drawings

OZONE RESISTANT, CATIONIC DYEABLE NYLON CONTAINING LITHIUM, MAGNESIUM OR CALCIUM SALTS OF SULFONATED POLYSTYRENE COPOLYMERS

BACKGROUND OF THE INVENTION

This invention relates to synthetic fiber-forming polyamides, and shaped articles therefrom which have excellent affinity for basic or cationic dyestuffs.

It is an object of this invention to provide a new and useful polyamide. These polyamides are useful as shaped articles, particularly fibers which can be made into a textile fabric such as carpet. Another object is to provide a shaped article which has increased affinity to cationic dyes. Another object is to provide a cationic dyed polyamide which has increased resistance to ozone fading, improved wash fastness and increased dye lightfastness.

The polysulfonic acids described in U.S. Pat. No. 3,665,054, have a lower degree of sulfonation, less than 50 percent, compared to the polysulfonic acid described here which is at least 90 percent sulfonated.

The salts of sulfonic acids of styrene copolymers in which the styrene is sulfonated to a high degree have been reported to be insoluble in nylon. This insolubility is described in U.S. Pat. No. 3,553,286, which states that a vinyl polymer having pendant sulfonic acid groups in which the whole of the sulfonic acid group is present in the form of an alkali metal (Li, Na, or K) or calcium salt has bad compatibility with polyamide. We have confirmed that the sodium salt and the potassium salt do indeed have poor compatibility with nylon 6. This is shown below by Examples 1, 2, 3 and 4.

SUMMARY OF THE INVENTION

We have found, to our surprise, that the lithium, magnesium and calcium salts of sulfonated copolymers of styrene, or vinyl toluene in which the benzene rings are predominantly sulfonated, are compatible with nylon 6, and are largely retained by the nylon despite aqueous treatments such as leaching the polymer pellets, and dyeing the yarn. By sulfonated copolymers is meant a copolymer containing at least 50% by weight styrene or vinyl toluene reacted with at least one of the following monomers or their next adjacent homologs: acrylonitrile, methyl methacrylate, acrylate esters, methylacrylate esters, acrylic acid, methacrylic acid, butene, methyl vinyl ether, ethylene, propene, 2-pentene, 2-methyl propene. These copolymers are listed in "Styrene, Its Polymers, Copolymers & Derivatives", by R. H. Boundy and R. F. Boyer, pages 994–1057, Reinhold, 1952.

The invention is a method to provide a polyamide article which contains a small amount of the lithium, magnesium or calcium salt of a sulfonated copolymer of styrene or vinyl toluene. The preferred salt is that of lithium because of increased yarn brilliance compared to the magnesium or calcium salts.

The preferred molecular weight for the salt of the sulfonated copolymer of styrene or vinyl toluene is from about 15,000 or preferably about 30,000 to about 300,000. The lower limit is fixed by the requirement for it to be retained by the nylon through the wet processing. The upper limit is proposed because the easiest method of handling the salt is as an aqueous solution, and a very high molecular weight polymer gives a solution which is too viscous to handle conveniently.

The pH of the salt of the sulfonated copolymer must be adjusted to between 3 and 8. At lower pH's the acid decomposes at temperatures above 100° C. At higher pH's the color of the salt solution becomes green, and any polymer made with this solution is off-color. Use of the acid, such as claimed in U.S. Pat. No. 3,665,054 is not workable due to this severe discoloration and slow polymerization.

The salt of the sulfonated styrene copolymer is preferably added to the polyamide precursor as an aqueous solution, and then this mixture together with light stabilizers such as manganese salts, polymer molecular weight regulators such as acetic acid, sebacic acid, azelaic acid, or 5-sulfoisophthalic acid, and delustrants, if desired, is subjected to polymerization conditions. The preferred concentration of sulfonates present is between 50 and 150 equivalents per $10^6$ grams, but up to about 600 equivalents can be used in a master batch.

The polymerization is done under conditions normally employed for polymerizing caprolactam. The lactam can be polymerized under steam presssure to initiate polymerization, as in the case of pure nylon 6, then under atmospheric pressure to reach the desired degree of polymerization, and then either subjected to high vacuum to remove unreacted monomer, or extruded as strands which are then pelletized and water-extracted to remove the unreacted monomer.

As an alternative to addition of the salt to the polymer precursor, an aqueous solution of the salt can be coated on polymer chips, and the water taken off by evaporation. The polymer with the salt of sulfonated styrene copolymer can be shaped into an article or spun into fibers by spinnerettes containing the normal filtering sand packs or sintered metal. The pressure drop through the spinnerette was no greater than the control yarn without any additive.

The undrawn yarn gives packages of excellent package formation, with well-shaped corners to the edges of the yarn on the bobbins or carriers.

The drawn yarn has an excellent affinity for cationic dyes. The uptake for some cationic dyes, for example, Sevron Yellow 8GMF,

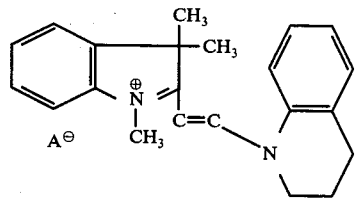

where A is an anion, is proportional to the equivalents of sulfonate in the yarn. Other cationic dyes, for example Aztrazon Blue 3RL, identified in U.S. Pat. No. 3,794,464, filed Feb. 4, 1972, are essentially exhausted from the dye bath, and are not affected by the number of sulfonate equivalents within a range of 30 to 180 gram equivalents of sulfonate per $10^6$ gram of polymer. The uptake of disperse dyes is not materially affected by the amount of sulfonate in the yarn. Uptake of acid dyes can be inhibited by the use of a monocarboxylic acid or dicarboxylic acid as a molecular weight regulator, which also decreases the concentration of amine ends preferably to 15–25 equivalents per $10^6$ grams.

The dyed sleeves made with these salts of sulfonated styrene or vinyl toluene copolymer also have excellent resistance to ozone fading compared to the cationic dyeable polymer made with 5-sulfoisophthalic acid.

The sulfonated copolymers can be prepared according to U.S. Pat. No. 3,072,618.

The copolymers which can be used are for example copolymers of styrene and/or vinyl toluene with at least one of the following: acrylonitrile, methyl methacrylate, acrylate esters, methacrylate esters, acrylic acid, methacrylic acid, butene, methyl vinyl ether, ethylene, propene, 2-pentene, 2-methyl propene. At least 50% is styrene or vinyl toluene.

This invention is an improvement on the prior art method to make a fiber-forming synthetic linear polyamide having a repeating structure of

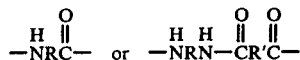

where R and R' are radicals of 3 to 13 carbon atoms receptive to cationic dyes by the addition of a sulfonated polystyrene or salt thereof. These prior art polyamides have from about 10 to about 60 amine gram-equivalents per $10^6$ grams of polymer and a ratio of less than 10 sulfonate gram-equivalents per amine gram-equivalent. The improvement is adding to the polyamide a water soluble salt of a highly sulfonated styrene copolymer selected from the group consisting of lithium, magnesium and calcium salts. The salt should have a pH of between about 3 and about 8. Then the shaped article is made such as by spinning to fiber. The salt should preferably be sulfonated to over 90 percent of the theoretical maximum of complete monosulfonation of each styrene residue moiety. The salts of this invention can also be added to the polyamide precursors prior to polymerization, then the precursors are polymerized and the polymer is shaped by such methods as spinning to a fiber. The dyed polyamide article has highly improved resistance to fading of the cationic dye due to exposure to ozone. The method of testing for ozone fading is similar to the AATCC Test 129-1968 set forth on page 334/15 of *The Journal of American Association of Textile Chemists and Colorists*, July 30, 1969, Volume 1, No. 16, in an article entitled, "A New Test Method for Ozone Fading at High Humidity", by Victor S. Salvin.

The method and the means of measuring the loss of dye consists in dyeing the yarn with a selected dye or dyes, exposing it to ozone at a concentration of 20 parts per hundred million in a test chamber together with a control nylon sample which is dyed an avocado shade. The control sample is examined periodically until the resulting color corresponds to that of the Standard of Fading (one cycle). It has been found that one cycle is completed when the internal standard has faded sufficiently to give a $\Delta E$ of 2.8, compared to the unexposed standard.

$\Delta E$ is a measure of the change of color between two samples, a smaller $\Delta E$ being a closer match, or less fading of one sample compared to the second sample.

This color difference, $\Delta E$ was measured with a Hunterlab Color Difference Meter. This instrument measures color as seen in average daylight in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. These measurements made correspond to the way the average human eye responds to light.

$$\Delta E = \sqrt{(\Delta L)^2 + (\Delta a)^2 + (\Delta b)^2}$$

where
$\Delta L$ is $L_1 - L_2$
$\Delta a$ is $a_1 - a_2$
$\Delta b$ is $b_1 - b_2$ and $L$, $a$, and $b$ are readings on the Hunterlab Color Difference Meter. "$L$" is a 100 to 0 reading of white to black; "$a$" indicates redness when positive, gray when zero, and green when negative; "$b$" indicates yellow when positive, gray when zero and blue when negative.

The yarns containing these salts of sulfonated copolymers also have improved dye wash fastness, and dye light fastness, compared to cationically dyeable nylon made with salts of 5-sulfoisophthalic acid.

These advantages of the subject invention and the methods of practicing the invention are shown in the following examples.

DESCRIPTION OF PREFERRED EMBODIMENTS AND COMPARATIVE EXAMPLES

EXAMPLE 1

(Comparative)

29.5 Grams of the sodium salt of sulfonated polystyrene was dissolved in 100 grams of water. The molecular weight of the polymeric salt is about 70,000 (This material is available commercially from National Starch and Chemical as Versa TL-70). The pH of a 1% aqueous solution varies from 5.5 to 7.5. This aqueous solution was added to 1520 grams of caprolactam. 6.8 Grams of sebacic acid was added as a molecular weight regulator. The solution was homogeneous. Then 80 grams of e-amimocaproic acid was added as a polymerization initiator, and the mixture was poured into a 3-liter agitated glass reactor equipped with a heating mantle. The mixture was heated over a period of about 1½ hours, under a nitrogen blanket (50 cc of nitrogen gas per minute) to 255° C. As the water flashed off the polymerization mixture, the sodium salt of polystyrene sulfonic acid separated from the lactam. At the end of twelve hours a polymer ribbon was extruded from the bottom of the reactor which was pale yellow and full of white lumps. Unreacted caprolactam was removed by water extraction, and dried. The washed and dried polymer was submitted for analysis. The relative formic acid viscosity was 69, with 65 equivalents of carboxyl and 20 equivalents of amine per $10^6$ grams. Sulfur analysis by x-ray fluorescence showed 1740 parts per million sulfur, or about 54 equivalents of sulfur per $10^6$ grams. Spinning of this polymer into fiber was precluded by the large amounts of insolubles in the polymer, even after washing.

EXAMPLE 2

(Comparative)

20 Grams of the same sodium salt of polystyrene sulfonic acid was dissolved in 100 grams of water and this solution was poured over 1,000 grams of a nylon 6 polymer of about 70 relative formic acid viscosity. The mixture was tumble-dried under vacuum to coat the nylon 6 pellets with the salt. The dried polymer was submitted for spinning. It was fed into a 1-inch diameter extruder, which delivered molten polymer to a metering pump, and then to a filtering sand pack. The extruder, pump and sand pack were heated to about 270° C., and the polymer fed into the extruder. After about five minutes, the pressure drop across the sand pack was so great that the support for the sand pack broke, sending fine sand and dark brown polymer through the spinnerette holes. A repeat with a reduced sand pack had the same result. The polymer without any coating had spun well, without discoloration immediately prior to the first mentioned spinning attempt, with the full sand pack.

EXAMPLE 3

(Comparative)

15 Grams of the sodium salt of polystyrene sulfonic acid of about 500,000 molecular weight was dry blended with 1,000 grams of a nylon 6 polymer of about 70 relative formic acid viscosity, 70 carboxyl equivalents, and 16 amine equivalents per $10^6$ grams of polymer. This polymer was fed into the same spinning system as described in Example 2. As in Example 2, the pressure drop through the sand rose rapidly and the sand pack broke. After the sand pack broke, sand and black polymer came through the spinnerette holes.

A similar polymer, but without the polystyrene sulfonate, had been spun immediately preceding the above blend without excessive pressure drop or polymer discoloration.

EXAMPLE 4 (Comparative)

68.5 Grams of a 30 percent solution of sulfonated polystyrene of about 70,000 molecular weight was neutralized by the addition of 8.22 grams of potassium hydroxide. (This polystyrene sulfonic acid is available from National Starch and Chemical as Versa TL-71).

This aqueous solution was added to 1520 grams of caprolactam. 6.0 Grams of sebacic acid was added as a molecular weight regulator. The solution was homogeneous. The solution, together with 80 grams of e-aminocaproic acid was poured into an agitated reactor and subjected to polymerization conditions as described in Example 1. As in Example 1, when the water was boiled off the potassium salt of polystyrene sulfonic acid separated as white lumps in the molten polymer, confirming the contention in U.S. Pat. No. 3,553,286 that the potassium salt has bad compatibility with polyamide.

When the polystyrene sulfonic acid was neutralized with zinc carbonate, or gelatinous aluminum hydroxide, the same incompatibility was observed.

EXAMPLE 5

A copolymer of 80 mole percent styrene and 20 mole percent methyl acrylate is made. The number average molecular weight is about 100,000. This polymer is sulfonated according to the technique described in U.S. Pat. No. 3,072,618.

This polymer 25.5 grams is neutralized with 4.6 grams of lithium carbonate dissolved in water.

This solution is added to 1520 grams of caprolactam at 90° C. Manganese chloride (0.576 grams) and a 50% solution of hypophosphorous acid (0.1640 grams) are added to serve as light stabilizers.

This solution is poured into a 3-liter agitated glass reactor equipped with a heating mantle, and a gas inlet and outlet to provide a nitrogen blanket over the molten mixture. 80 Grams of e-aminocaproic acid is added as a polymerization initiator. The mixture is then heated over a period of about 1½ hours to about 255° C. When the water flashed off there is no phase separation.

At the end of 4¾ hours a polymer ribbon is extruded from the bottom of the reactor, which is pale yellow, without lumps and of constant cross section. Unreacted caprolactam, about 10% by weight, is removed by water extraction. The washed and dried polymer is submitted for analysis.

The relative formic acid viscosity is 61, with 75 equivalents of carboxyl and 28 equivalents of amine per $10^6$ grams of polymer. Sulfur analysis by x-ray fluorescence of the washed and dried polymer would show 2480 parts per million sulfur, or about 67 equivalents of sulfur per $10^6$ grams of polymer. A sample of the unwashed polymer would contain about 2550 parts per million sulfur. The theoretical concentration of sulfur, based on the amount of polystyrene sulfonic acid salt added is 2500 parts per million.

The polymer is submitted for spinning. It is spun using the same spinning equipment as described in Example 2. The spinnerette has 14 holes each in the shape of a "Y" to get a yarn with a "Y" cross section. The spinning temperature is about 275° C. Pressure drop across the sand pack in the spin pot is about 5900 psi.

The undrawn yarn would have a total denier of 710 or an average of 50 denier per filament. The free fall yarn is 57 relative formic acid viscosity, with 73 carboxyl equivalents and 23 amine equivalents per $10^6$ grams of polymer. Five ends of this yarn are gathered and drawn to 3.2 times the spun length, and then two-plied to give a yarn of 2260 total denier. This yarn would have a tensile strength of 3.0 grams per denier, and an ultimate elongation of 46%. A control yarn (pure nylon 6) spun at the same time had a tensile strength of 3.3 grams per denier and an ultimate elongation of 53 percent.

A control yarn was made from a nylon 6 polymer having a relative formic acid viscosity of 46, about 90 carboxyl equivalents, about 25 amine equivalents with about 81 sulfonic groups, from the sodium salt of sodium 5-sulfoisophthalate. It was spun on the same spinning equipment as described above, drawn, knitted into sleeves, and autoclaved as was the yarn above.

The yarns are dyed in separate dye baths to a moss green shade in a dye bath composed as follows:

0.3% (OWF) Sevron Yellow 8GMF (DuPont)
0.25% (OWF) Sevron Blue GCN (DuPont), C.I. Basic Blue 97
2.0% (OWF) Hipochem PND-11 (amine salt of an alcoholester)
1.0% (OWF) Hipochem CDL-60, (nonionic surfactant)

and monosodium and/or disodium phosphate to adjust the pH of the dye bath to 7.0 ± 0.2.

The dyed sleeves are then exposed for 6, 12 and 18 hours in an atmosphere of about 20 parts per hundred million of ozone, at a temperature of 104° F., at a relative humidity of 95–100 percent.

The results of ozone exposure are listed below:

|  | ΔE | | |
| --- | --- | --- | --- |
|  | 6 Hrs. | 12 Hrs. | 18 Hrs. |
| a) control, polymer with 5- | 6.2 | 10.2 | 14.2 |

-continued

|  | ΔE | | |
|---|---|---|---|
|  | 6 Hrs. | 12 Hrs. | 18 Hrs. |
| sulfoisophthalate | | | |
| b) Polymer with lithium salt polystyrene sulfonic acid copolymer | 1.1 | '2.4 | 2.7 |

The undyed sleeves described above are also dyed in a second set of dye baths where 0.25% of Astrazon Blue 5GL, C. I. Basic Blue 45, is substituted for 0.25% of Sevron Blue GCN, C. I. Basic Blue 97,

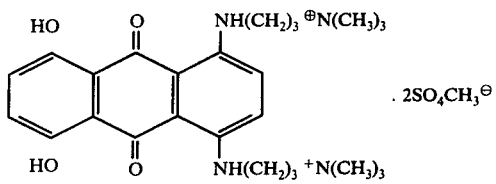

These dyed sleeves are also exposed to 6, 12, and 18 hours in the above ozone chamber. The results of ozone exposure are:

|  | ΔE | | |
|---|---|---|---|
|  | 6 Hrs. | 12 Hrs. | 18 Hrs. |
| a) control, polymer with 5-sulfoisophthalate | 6.3 | 12.1 | 16.6 |
| b) polymer with the lithium salt of the sulfonic acid of the copolymer of styrene and methyl acrylate | 2.1 | 4.2 | 5.3 |

Exposure of a third set of dyed yarns where Aztrazon Blue 3RL (C. I. Basic Blue 47) is substituted for Astrazon Blue 5GL gave Δe's generally around 3 to 4 after 18 hours.

The yarn with the lithium salt of the sulfonic acid of styrene-methyl acrylate copolymer and the yarn with 5-sulfoisophthalic acid sodium salt are also dyed with 0.5% (OWF) Astrazon Blue 5GL and exposed to Xenon light in an Atlas Weatherometer for 60 hours. The former yarn would take about 40 hours to get a color "break", while the latter broke in only 20 hours. By "break" or "broke" is meant a noticeable change in color or shade of the same sample exposed compared to an adjacent unexposed portion.

EXAMPLE 6

A copolymer of about 50,000 molecular weight, consisting of about 70% styrene and 30% acrylonitrile is sulfonated and then neutralized with 25.8 grams of lithium carbonate. 26.4 grams of this solution is added to 1520 grams of caprolactam at 90° C. 0.0576 Gram of manganous chloride and 0.1640 grams of a 50% solution of hypophosphorous acid and 8.0 grams of sebacic acid are added, and the clear, homogeneous solution is poured into a 3-liter agitated reactor. 80 Grams of e-aminocaproic acid is added, and the material is subjected to polymerization conditions, as in Example 5.

After 11 hours of polymerization, the polymer is leached and dried. Analysis of the polymer gives a relative formic acid viscosity of 47.3, with 81 carboxyl equivalents and 27 amine equivalents per $10^6$ grams of polymer. The sulfur analysis showed 2430 parts of sulfur per million parts polymer.

The polymer is spun in the same manner as was the polymer of Example 5. The spin pot temperature is 255° C., pressure drop across the filter in the spin pot is 2500 psi. The undrawn yarn, total denier 707, is taken up at a speed of 990 feet per minute. The free fall yarn gives a relative formic acid viscosity of 44, with 2460 parts of sulfur per million parts of polymer. Five ends of the undrawn yarn are gathered and drawn to about 3.2 times the spun length, and then two-plied to give a yarn of 2180 total denier. This yarn has an ultimate elongation of 45 percent, and a breaking strength of 2.2 grams per denier.

A control yarn made from the same type of polymer as the control yarn of Example 5 is spun immediately preceding the above yarn. The yarn takeup speed is 965 feet per minute to give an undrawn yarn of 720 denier. Pressure drop across the spin pot is 1700 psi. The undrawn yarn is gathered, drawn and two-plied as above to give a yarn of 2300 total denier. This control yarn has an ultimate elongation of 48%, and a breaking strength of 30 grams per denier.

These yarns are knitted into sleeves, autoclaved at 270° F. and dyed in separate dye baths each containing 0.2% Sevron Blue GCN (OWF). The dye pickup is similar, but the yarn containing the lithium salt of polystyrene sulfonic acid exhausts the dye bath, while the control yarn leaves some blue dye in solution.

Sections of both sleeves are also dyed to a moss green shade in a dye bath made up as the first mentioned bath of Example 5, i.e., 0.25% Sevron Blue GCN, etc. They are then submitted for exposure to 20 parts per hundred million of ozone, for 3 cycles.

The results of ozone exposure are:

|  | ΔE |
|---|---|
| a) control yarn, containing 81 equivalents of sulfonate from 5-sulfoisophthalic sodium salt | 16.4 |
| b) polymer with the lithium salt of styrene sulfonic acid, acrylonitrile copolymer | 3.0 |

EXAMPLE 7

A copolymer of 75% styrene and 25% 2-pentene having a molecular weight of about 120,000 is sulfonated using the technique described in U.S. Pat. No. 3,072,618. An aqueous solution (155.7 grams) of sulfonated polymer is neutralized with 31.6 grams of magnesium carbonate. About one sixth of this solution is added to 1520 grams of caprolactam at 90° C., containing 0.0576 grams of manganous chloride and 0.1640 grams of a 50% solution of hypophosphorous acid, to give a clear, colorless solution. This solution is poured into a 3-liter agitated reactor. 80 Grams of e-aminocaproic acid is added, and the mixture is subjected to polymerization conditions similar to those of Example 5.

At the end of 12½ hours a polymer strand is taken from the bottom of the reactor. The strand is pelletized, washed to remove lactam, and dried. The resulting polymer has a relative formic acid viscosity of 48, with 72 carboxyl equivalents and 23 amine equivalents per $10^6$ grams of polymer. Sulfur analysis by x-ray fluorescence shows 2620 parts per million sulfur.

The polymer is spun in a manner similar to that described in Example 5. Spinning temperature is 280° C. Pressure drop across the spin pot filter is 2600 psi. The undrawn denier is 720. After gathering five ends together, drawing and two-plying, the resulting yarn has a total denier of 2300. The relative formic acid viscosity is 49, and the sulfur content is analyzed to be 2600 parts per million. The yarn has an ultimate elongation of 40%, and tensile strength of 2.1 grams per denier.

The yarn is knitted into sleeves, autoclaved at 280° F., and dyed to a moss green shade in a dye bath which formulation is identical to the first-mentioned dye bath in Example 5.

The dyed sleeve together with a control sleeve similar to that of Example 5, which has been dyed in a dye bath containing the same formulations are then exposed to ozone. Ozone concentration is 20 parts per hundred million.

The results of exposure for 6, 12 and 18 hours are as follows:

|  | ΔE | | |
|---|---|---|---|
|  | 6 Hrs. | 12 Hrs. | 18 Hrs. |
| a) control | 7.5 | 12.0 | 15.2 |
| b) yarn with magnesium salt of styrene sulfonic acid-2-pentene copolymer | 0.8 | 1.5 | 2.3 |

The same yarns are dyed with 0.5% Astrazon Blue 5GL and exposed to xenon light for 10–60 hours. The control yarn takes 20 hours to develop a color break, the yarn of this invention takes 40 hours to break.

EXAMPLE 8

A copolymer of about 80,000 molecular weight consisting of 85% styrene and 15% methyl vinyl ether is sulfonated by a method similar to that described in U.S. Pat. No. 3,072,618 and then neutralized with calcium carbonate. 27.5 Grams of the salt, in aqueous solution, is added to a nylon polymerization similar to that described in Example 7.

After 10 hours at 255° C., the polymer produced has a sulfur content before washing of 2650 parts per million. The polymer is washed to remove monomer and dried. Analysis of the washed and dried polymer shows a relative formic acid viscosity of 50, with 71 carboxyl equivalents and 19 amine equivalents per $10^6$ grams of polymer. The sulfur analysis shows 2610 parts per million of sulfur.

The polymer is spun into fibers using the same equipment and in the same manner as that of Example 5. Spinning temperature is 255° C., pressure drop across the spinning filter is 2300 psi. Undrawn yarn of 720 denier, 14 filaments is taken up at 965 feet per minute. Five ends of undrawn yarn are gathered, drawn to about 3.2 times the spun length, and two-plied to give a yarn of 2280 denier with 140 filaments. The yarn has an ultimate elongation of 45%, and a tensile strength of 2.7 grams per denier.

EXAMPLE 9

(Comparative)

A polymer of 80% vinyl toluene and 20% butene having a molecular weight of about 100,000 is sulfonated as above and neutralized with lithium carbonate. 28.1 Grams of the salt in water solution is added to a nylon polymerization similar to that described in Example 8. The analysis of the polymer shows a relative formic acid of about 55, with 73 carboxyl equivalents and 26 amine equivalents per million grams of polymer.

Sulfur analysis shows 2620 parts sulfur per million parts polymer.

The polymer is spun in the same manner as is the polymer of Example 5. The spin pot temperature is about 260° C., and pressure drop across the spin pot filter is about 200 psi. Yarn is collected having an undrawn denier of 716. Five ends of yarn are gathered together drawn to about 3.2 times the spun length and then two-plied to give a yarn of 2270 total denier. This yarn has an ultimate elongation of 43% and a tenacity of 3.0 grams per denier.

I claim:

1. In a method to make a fiber-forming synthetic linear polyamide having a repeating structure of

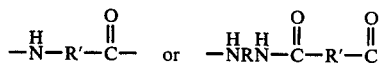

where R and R' are radicals of 3 to 13 carbon atoms, receptive to cationic dyes by the addition of a sulfonated polystyrene or salt thereof, said polyamide having from about 10 to about 60 amine gram equivalents per $10^6$ grams of polymer and a ratio of less than ten sulfonate gram equivalents per amine gram equivalents, the improvement comprising adding to said polyamide a water soluble salt selected from the group consisting of the lithium, magnesium and calcium salts of a sulfonated copolymer, said salt sulfonated to over 90 percent of the theoretical maximum of complete monosulfonation of each styrene residue moiety and having a pH of between about 3 and 8, said sulfonated copolymer is selected from the group consisting of a copolymer containing at least 50% by weight of styrene or vinyl toluene reacted with each other or at least one of the following monomers or their next adjacent homologs, acrylonitrile, acrylate esters, methacrylate esters, acrylic acid, methacrylic acid, butene, methyl vinyl ether, ethylene, propene, 2-pentene, 2-methyl propene, said salt has a molecular weight of from about 15,000 to about 300,000 and the concentration of sulfonates present in the polyamide containing the salt is between about 50 and about 150 gram equivalents per $10^6$ grams polymer, and shaping said polyamide into a shaped article, whereby said dyed polyamide article has highly improved resistance to fading of the cationic dye due to exposure to ozone.

2. The method of claim 1 wherein said salts are added to precursors of said polyamide and said polyamide containing said salts is polymerized.

3. The method of claim 1 wherein said salts are added as an aqueous solution.

4. The method of claim 1 wherein said salt is lithium salt.

5. The method of claim 1 wherein said salt is added highly concentrated in a master batch of said polyamide.

6. The method of claim 2 wherein a polymer molecular weight regulator is also added in an amount of from about 25 to about 90 gram equivalents per $10^6$ grams polymer.

7. The method of claim 6 wherein the polymer molecular weight regulator is 5-sulfoisophthalic acid.

8. The method of claim 1 wherein said shaping is spinning to form a fiber.

* * * * *